United States Patent
Wells

[15] 3,681,970
[45] Aug. 8, 1972

[54] METHOD OF FLAW DETECTION USING INTERNAL HEATING

[72] Inventor: Donald R. Wells, Riverside, Calif.
[73] Assignee: G. C. Optronics, Inc., Ann Arbor, Mich.
[22] Filed: March 9, 1970
[21] Appl. No.: 17,767

[52] U.S. Cl. .....................73/15.4, 73/71.3, 350/3.5
[51] Int. Cl. ..............................................G01n 25/00
[58] Field of Search........73/15.4, 15.6, 67.5 H, 71.3; 356/106; 350/3.5

[56] References Cited

UNITED STATES PATENTS

| | | | |
|---|---|---|---|
| 3,222,917 | 12/1965 | Roth | 73/15 |
| 3,020,745 | 2/1962 | Sielicki | 73/15 |

FOREIGN PATENTS OR APPLICATIONS

| | | | |
|---|---|---|---|
| 909,601 | 10/1962 | Great Britain | 73/15 |

OTHER PUBLICATIONS

Holography and Its Applications, A. E. Ennos, Contemp. Phys., 1967, Vol. 8, No. 2 p. 162- 165.

*Primary Examiner*—Richard C. Queisser
*Assistant Examiner*—John P. Beauchamp
*Attorney*—McGlynn, Reising, Milton & Ethington

[57] ABSTRACT

A method and apparatus are disclosed for nondestructive testing for subsurface flaws in a workpiece. The surface configuration of the workpiece is recorded and heat is induced in the interior of a discrete volume of the material. Then the surface configuration of the workpiece is compared during the dispersion of heat from the discrete volume with the recorded surface configuration to reveal differences as an indication of a flaw. The heating of the interior material is accomplished by producing electrical currents therein as by induction heating. The comparison of the surface configuration during the dispersion of heat with the recording of the surface configuration is preferably accomplished by the use of holographic interferometry.

9 Claims, 7 Drawing Figures

PATENTED AUG 8 1972 3,681,970

INVENTOR.
Donald R. Wells
BY
Barnard, McGlynn & Reising
ATTORNEYS

METHOD OF FLAW DETECTION USING INTERNAL HEATING

This invention relates to nondestructive testing and, more particularly, to a method of detecting subsurface flaws in a workpiece such as a structural member.

There is a continuing need for improved nondestructive testing techniques for structural members to provide a higher degree of reliability in the detection of flaws, especially internal flaws. It is known that in certain applications, a minute internal flaw in a structural member may not be detectable by present nondestructive techniques and yet when the member is put into use, in its operating environment under design load conditions, such a flaw may ultimately produce a failure. Flaw detection with the desired degree of sensitivity and resolution has been especially problematical in fabricated structural members designed for high strength, low weight applications. For example, in laminated metal structures, such as those using a honeycomb core and outer skin layers and those comprising adhesively bonded thin sheets for aircraft surfaces and structural parts, it has been difficult to detect flaws in the subsurface bonds. Another example of long standing is that of detecting flaws in or adjacent to welded joints. A technique is needed to detect such flaws with a high degree of reliability without imposing or subjecting the structure to undue stress during the testing operation.

It is already known in the prior art that certain types of flaws may be detected by observing surface configuration changes while the workpiece is heated. This has heretofore been accomplished by using real time holographic interferometry as the technique for observing changes in the surface configuration and by utilizing a source of radiant heat, such as an infrared lamp for changing the temperature of the workpiece. This technique is disclosed and claimed in copending application Ser. No. 718,678, now abandoned, entitled "Method of Real Time Holographic Deformation Analysis" filed Apr. 4, 1968 and assigned to the same assignee as this application. While this prior art technique is very useful for certain applications, it is subject to certain limitations. Heating of the workpiece by radiation results in temperature change of a large part of the entire mass of the workpiece, i.e., with heat dispersion throughout the workpiece. Thus, a large part of the observed surface may be heated to an elevated temperature before there is any substantial temperature change in the locality of a subsurface defect. As a result there may be a gross deformation of the surface by reason of thermal expansion so that any deformation resulting in the localized area of a defect would be masked or otherwise rendered undetectable by the gross deformation. Furthermore, heating the workpiece by radiant heat, such as infrared radiation produces unwanted visible light which interferes with the observation of the workpiece surface using holographic interferometry. Thus, the prior art technique wherein the workpiece surface is heated by radiation and observed by holographic interferometry is ineffective to reveal certain subsurface flaws.

In accordance with this invention there is provided a method of nondestructive testing to detect the location and character of subsurface flaws with a degree of reliability not heretofore achieved. This is accomplished by recording the surface configuration of a selected portion of the workpiece and inducing heat in the interior of a discrete volume of the material and then comparing the surface configuration of the selected portion during the dispersion of heat from the discrete volume with the recorded surface configuration to identify areas of differential change of configuration as an indication of a flaw. The heating of the interior of the material is most suitably accomplished by inducing electrical currents in the discrete volume so that heat is generated internally. In particular, electrical induction heating is used with induction coils disposed adjacent the surface of the material. The induction coil is suitably formed to define an opening through which the observation of the surface may be made and thus the comparison of the surface configuration in first and second states may be made using techniques of holography. This permits observation of the surface over a period of time during which the induction coil may be energized by impulses of electrical excitation at spaced time intervals, and thus the observation may be made by real time holographic interferometry to produce fringe patterns indicative of subsurface flaws.

A more complete understanding of this invention may be obtained from the detailed description which follows taken with the accompanying drawings in which.

Figure 1:
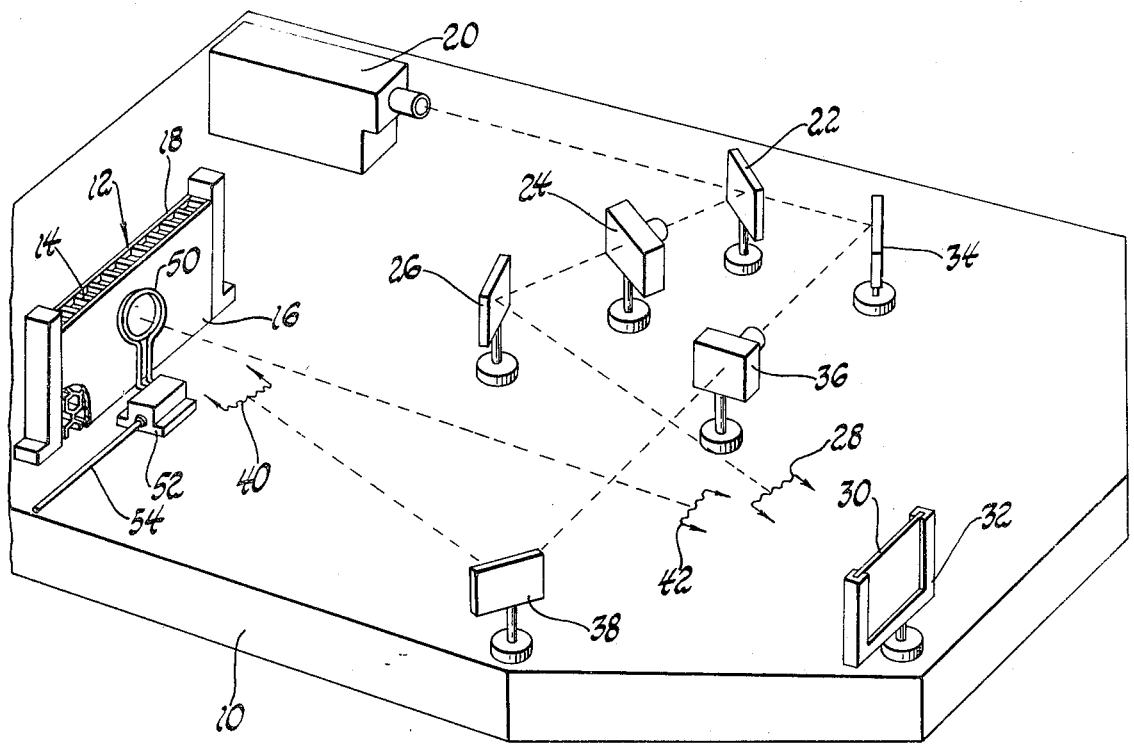
FIG. 1 is a diagram of apparatus adapted for the practice of the subject invention.

It has been found, in accordance with this invention, that subsurface flaws may be detected in a metallic member by inducing heat internally of a discrete volume thereof and then observing changes in the surface configuration of the member. It has also been found to be significant in the detection of certain flaws that the heat is generated internally of the material of the member rather than by application of heat to the surface of the member. Although the explanation of the phenomenon is not known with certainty, it is believed that localized changes in surface configuration will occur when a temperature differential is produced within the member even in regions below the surface. In the case of a subsurface flaw, such as a minute crack in the material or the inclusion of a foreign material, such a flaw will have a different thermal conductivity than the material of the member and thus will present a different impedance to the flow of heat. Thus, a temperature differential across a flaw within the material will produce a differential thermal expansion which will be transmitted through the material to produce a surface effect in the form of a change of surface configuration. Such a change will be transient in character so that after a sufficiently long period of time the material on opposite sides of the flaw will achieve the same temperature, and the differential thermal expansion will subside and vanish. Since heat will be dispersed in the material in all directions from the point of highest temperature, the induction of heat within a discrete volume of material at any location in the vicinity of a flaw would seemingly be effective to produce a temperature differential across the flaw regardless of its shape or orientation, at least momentarily. The magnitude of the temperature differential depends upon the rate at which the heat is induced in the discrete volume and the rate of dispersion of heat to the surrounding material. The use of electrical induction heating to produce the internally generated heat in a discrete volume is thus especially advantageous to effect a transient temperature differential of substantial magnitude because a large amount of heat energy can be thus produced in a short time. To take advantage of this attribute of induction heating, it has been found desirable to generate the heat in discrete time-spaced impulses. To obtain deeper penetration of the material, the use of induction heating at relatively low frequencies with a high degree of coupling between the coil and the material is desirable.

In order to utilize the phenomena of internal heating for flaw detection by surface inspection, it is necessary to utilize a technique which will reveal the most minute changes in surface configuration. This is provided by the techniques of holographic interferometry which may reveal with great accuracy surface distortion or displacements on the order of a fraction of a wavelength of light in the visible spectrum. With the holographic technique the changes in the surface configuration are observed using either real time or double-exposure holographic interferometry.

As is well known, holography is an image-forming process in which a wavefront interference pattern is recorded and wavefront reconstruction therefrom is utilized to produce an image of a three-dimensional object. In making a hologram the object is illuminated with a beam of coherent wave energy, and the wavefront reflected therefrom and a reference wavefront are superposed and recorded. The reflected wavefront alone lends intensity distribution to the recorded information and the reference wavefront lends phase information. The reference wavefront and the object wavefront taken together and superposed in the space occupied by the recording medium produces an interference pattern comprising a diffraction grating. It is common practice to use a laser as the source of coherent electromagnetic energy at optical wavelengths with a receiver or recording medium in the form of a photographic plate with a high resolution photographic emulsion. In order to reconstruct the wavefront to form a three-dimensional image of the object the hologram is illuminated by a wavefront identical to that of the reference wavefront and diffraction at the hologram recreates the object wavefront. Because of the presence of both intensity information and phase information in the object wavefront an observer looking through the hologram sees an image in three dimensions of the original object.

In real time holographic interferometry interference occurs between wavefronts produced by the hologram and the wavefronts from the object. The wavefronts from the hologram are reconstructed with the hologram in the same position as when it was recorded and the object is simultaneously illuminated with the source of coherent light that it was illuminated with during the recording of the hologram. Thus, the image of the object is superposed on the object and if there is any difference in the configuration interference fringes are produced. When the object is slightly deformed or displaced corresponding changes in the fringes are produced at the same time.

In double-exposure of time-lapse holographic interferometry two different holograms are produced with the object in two different conditions. A hologram of the object is first recorded and then the object is slightly displaced or deformed and a second exposure is made on the same photographic plate. Reconstruction results in two superposed images and interference fringes are produced corresponding to the change of configuration between the first and second exposures.

In the detailed description of the invention that follows the inventive method will be described with reference to a preferred embodiment in which the internal heating is produced by induction heating and the change in surface configuration is detected by real time holographic interferometry. The drawings show an illustrative embodiment of apparatus suitable for practice of the invention using the preferred techniques described above.

Referring now to FIG. 1 there is shown the apparatus utilized in the practice of the invention wherein the workpiece is heated internally by electrical induction heating and the effects are observed by real time holographic interferometry. The apparatus comprises a stable optical table 10 on which is supported a workpiece 12 which is to be tested by the subject invention for internal flaws. The workpiece illustrated in FIG. 1 and additionally in FIGS. 2 and 3 comprises a member of honeycomb structure which includes a metallic core 14 of honeycomb or corrugated configuration with a thin metallic sheet 16 secured to one side of the core and a thin metallic sheet 18 secured to the other side of the core. In such structures, the core and outer sheets are secured together by an adhesive bond and it is desired to inspect the member for defects or flaws in the bonded areas. For this purpose, the workpiece is mounted by a suitable support in a fixed position on the table 10.

The holographic apparatus, as shown in FIG. 1, comprises a laser 20 as a source of coherent waves and mounted in a fixed position on the table 10. The laser is suitably a helium neon gas laser operated in a continuous wave mode at a wavelength of 6,328 angstroms. The output beam of the laser is directed upon a beam splitter 22 which divides the beam into two paths. One of the beam paths is adapted to produce a reference beam or wavefront that extends from the beam splitter 22 through a spatial filter 24 to expand the beam and eliminate unwanted diffracted waves caused by anomalies in the optics. The spatial filter may suitably take the form of the well known lens-pinhole arrangement in which the lens focuses the nearly collimated laser beam to a point where the pinhole spatially filters the unwanted waves. The output beam of the filter is reflected from a mirror 26 as a reference wavefront 28 onto a recording medium in the form of a photographic plate 30 which is removably supported in a plate holder 32.

The other beam path from the beam splitter 22 is adapted to produce an object wavefront and includes a mirror 34 and a spatial filter 36. The filter 36 is suitably of the same structure as filter 24 and expands the beam and eliminates the unwanted waves. The output beam from the filter 36 impinges upon a mirror 38 which reflects it as a beam or wavefront 40 onto the surface of the workpiece 12 from whence it is reflected as an object beam or wavefront 42 upon the front surface of the photographic plate 30. As is well known, the object beam and the reference beam interact in the plane of the emulsion on the photographic plate and produce a wavefront interference pattern. After a sufficient time of exposure of the photographic plate, the laser beam is turned off and the hologram of the surface of the workpiece 12 is then completed by developing the photographic emulsion to produce a permanent record of the wavefront interference pattern. This pattern is in the nature of a diffraction grating which contains sufficient information to represent the configuration of the surface of the workpiece 12 in the condition or state thereof when the hologram is produced. The hologram is ready for use in reconstructing the wavefront produced by the surface of the workpiece 12 in the configuration recorded thereby. The reconstruction may be accomplished as is well known by illuminating the hologram with a monochromatic beam of light similar to the reference wave. Such illumination causes the reconstruction of the wavefront by diffraction of the reference beam and thus when an observer looks through the hologram he sees a virtual image of the surface of the workpiece 12.

In order to execute the next step of the testing method by use of real time interferometry, the developed hologram on the photographic plate 30 is repositioned in the same space it occupied when the hologram was made. With the laser beam turned on the reference beam 28 will illuminate the hologram and an observer behind the hologram and looking through it will see the virtual image of the surface of the workpiece 12. At the same time the observer will see the surface of the workpiece 12 as it is illuminated by the beam from the filter 36 and mirror 38. With the surface of the workpiece 12 in the identical condition as it was when the hologram was made the observer would see the actual surface thereof and the image thereof superposed thereon and there would be no discernable difference.

In order to produce a changing condition in the workpiece 12 in accordance with the invention by inducing internally generated heat in a discrete volume thereof, apparatus is provided to induce electrical current therein. Such apparatus includes an electrical induction heating coil 50 which is suitably supported upon a terminal block 52 which may be slidably supported upon the surface of the table 10. Electrical energy of high frequency is supplied to the coil 50 through a cable 54 which extends to a conventional induction heating power supply, not shown. The induction coil 50 is suitably formed in a annular configuration of a few turns of conductive wire so as to define an opening through which the surface of the workpiece 12 may be observed. The coil 50 is positioned closely adjacent the surface of the workpiece to obtain a high degree of energy coupling therewith. The coil may be of approximately 3 inches in diameter with about one-eighth inch spacing from the workpiece. The induction heater power supply is adapted to provide electrical energization a frequency of 250 kiloHertz. A useful range, however, may extend from about 150 kiloHertz to a few megaHertz. It is provided with suitable switching equipment so that the coil 50 may be energized with time spaced impulses of the order of 1 second duration.

Figure 2:
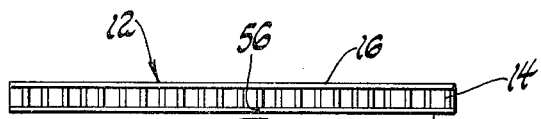
FIG. 2 is a view of the edge of a honeycomb workpiece.
Figure 3:
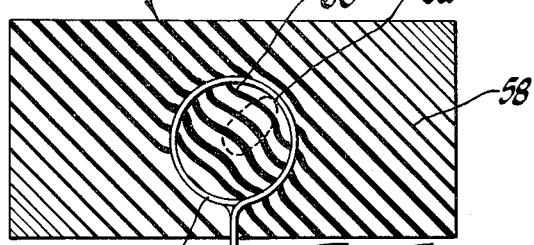
FIG. 3 is a view of the surface of the workpiece of FIG. 2 with fringe lines thereon.

With the apparatus and the workpiece 12 in the condition just described, i.e., the hologram in place for real time interferometry and the laser 20 energized, the workpiece 12 may now be examined for subsurface flaws. Referring to FIG. 2 and FIG. 3, assume that the workpiece 12 includes a flaw 56 in the form of a void or separation in the adhesive bond between the core 14 and the skin 18. The induction heating coil 50 is energized with impulses of high frequency electrical current with the successive impulses being approximately 1 second duration and being time spaced by intervals of a few seconds. As is well understood the current flow through the induction coil 50 will induce eddy currents in the conductive material of the workpiece 12 in a discrete internal volume thereof which is lined by the magnetic flux generated by the induction coil current. The eddy current flow in the discrete volume of the workpiece will, by reason of the ohmic losses therein, generate heat in the internal volume of the material concurrently with the flow of the eddy currents. The depth of the eddy current penetration into the material is a function of the frequency of the energizing current in the induction coil and in general, the penetration of the eddy current is increased as the energizing frequency decreases. At the same time the magnitude of the eddy currents induced in the material is a function of the degree of coupling between the coil and the workpiece at the energizing frequency. Additionally, the magnitude of the eddy currents is a function of the rate of change of magnetic flux linkage and hence the frequency of the energizing current in the coil so that the heat generated internally of the material decreases as the frequency decreases.

With the internal heating in progress the surface of the workpiece 12 is viewed through the hologram on photographic plate 30 and any displacement or distortion of the surface of the workpiece 12 will produce fringe lines corresponding to the change. For example, a uniform displacement of the surface by a very slight amount in a direction toward the hologram would produce a somewhat uniform array of fringe lines with approximately equal spacing. Since the induction coil 50 produces internal heating of the workpiece in the selected portion opposite the induction coil 50 with maximum heating immediately below the turns of the coil, there is a nonuniform displacement of the surface of the workpiece over the area viewed even though there are no flaws beneath the surface in the area viewed. Such a pattern of fringe lines may take the form shown in FIG. 3 wherein the fringe lines 58 outside the region of influence of the induction coil 50 are substantially straight and uniformly spaced. The fringe lines 60 within the region of influence of induction coil 50 are distorted with reference to lines 58 in the vicinity of a temperature gradient resulting from the internal heating such as occurs immediately below the coils. In the absence of a flaw, the fringe lines within that portion of the region of influence which is inside the bounds of said coil are substantially straight and parallel except for the ripple effect directly under the coil turns. A flaw such as flaw 56, however, produces a transient temperature differential and will thereby produce a surface effect which takes the form of a differential change in surface configuration represented by a local anomaly, enclosed by the dashed line 62, in the pattern of fringe lines. Thus, even the most minute flaws or defects, even those situated substantially beneath the surface, may be located by the method of the present invention just described.

Figure 4:
FIG. 4 is a cross sectional view of a laminated workpiece.
Figure 5:
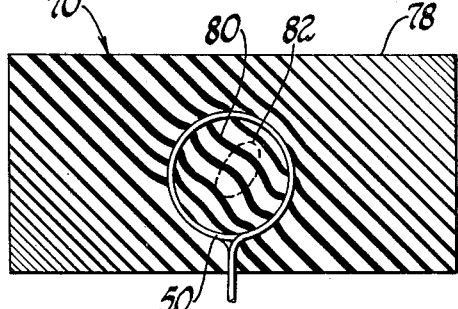
FIG. 5 is a view of the surface of the workpiece of FIG. 4 with fringe lines thereon.

Referring now to FIGS. 4 and 5 a different workpiece 70 is illustrated together with the fringe lines produced thereon by the occurrence of a flaw. The workpiece 70 comprises a laminated structural member with a metallic sheet 72 and a metallic sheet 74 bonded together by an adhesive material at the interface thereof. The workpiece 70 includes a flaw 76 in the form of a separation in the bond or a void in the adhesive at the interface of the metallic sheets. The testing method is performed as described above and produces a pattern of fringe lines 78 outside the region of influence of the induction coil 50 and a pattern of fringe lines 80 within the region of influence. However, at the locality of the flaw 76 there occurs an anomaly, enclosed by the dashed line 82, in the pattern of fringe lines which is indicative of the presence of the flaw.

Figure 6:
FIG. 6 is the cross sectional view of a welded joint in a workpiece.
Figure 7:
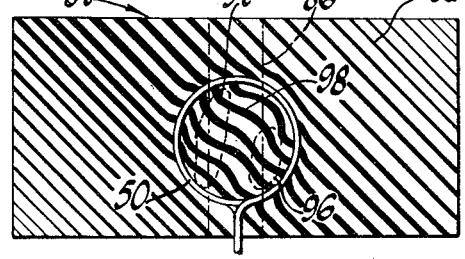
FIG. 7 is a view of the surface of the workpiece of FIG. 6 with fringe lines thereon.

As shown in FIGS. 6 and 7 a workpiece 84 in the form of a steel plate including a butt weld 86 may be tested for flaws in the region of the weld by the method of this invention. In this example the weld 86 contains a flaw 88 at the interface of the weld material and the parent metal which may take the form of a minute separation or void. Adjacent the weld there is also a second flaw 90 in the form of a crack extending below the surface as sometimes occurs from improper welding procedure. As shown in FIG. 7 the pattern produced by the method described above includes fringe lines 92 outside the region of influence of induction coil 50 and a pattern of fringe lines 98 within the said region. A first anomaly, enclosed by the dashed line 96, in the fringe pattern occurs in the vicinity of the flaw 88 to reveal this subsurface defect in the interface of the weld metal and the parent metal. A second anomaly, enclosed by the dashed line 94, occurs in the vicinity of the flaw 90.

Thus, it is seen that the subject invention provides a nondestructive testing method for detecting the presence and the character of subsurface flaws with great reliability. Although the description of the invention has been given with respect to a particular embodiment thereof, it is not to be construed in a limiting sense. Many variations and modifications of the inventive method will now occur to those skilled in the art. For a definition of the scope of the invention, reference is made to the appended claims.

The embodiments of the invention in which an exclusive property or privilege is claimed are defined as follows:

1. The method of detecting subsurface flaws in a member comprising the steps of; recording a pictorial representation of the surface configuration of a selected portion of the member, inducing internally generated heat by inducing electrical currents in the interior of a discrete volume of the member adjacent the selected portion, and interferometrically comparing the surface configuration of the selected portion during the dispersion of heat from the discrete volume with the recording of the pictorial representation of the surface configuration to identify areas of differential change of configuration as an indication of flaws.

2. The method of detecting subsurface flaws in materials comprising the steps of; making a hologram of a selected portion of the surface of the material; illuminating the hologram to reconstruct the wavefront to form an image of the selected portion of said surface, superposing the image on said selected portion of said surface, inducing internally generated heat in the interior of a discrete volume of the material adjacent the selected portion whereby the wavefront from the selected portion of said surface and the reconstructed wavefront from the hologram interfere to form a pattern of interference fringes indicative of differential change of configuration of the selected portion of said surface as an indication of flaws.

3. The invention as defined in claim 1 wherein the step of inducing heat in the discrete volume is performed by electrical induction heating with an induction coil disposed adjacent the surface of the material.

4. The invention as defined in claim 1 wherein the induction heating is produced by an induction coil having turns which define an opening opposite said selected portion of the material.

5. The invention as defined in claim 4 wherein said induction heating is produced by applying impulses of electrical energization to the induction coil at spaced time intervals, the step of comparing the surface configurations is performed throughout the time of application of several impulses and wherein the frequency of said electrical energization of the induction coil is low enough to obtain the induction of eddy currents internally of said volume of material but high enough to achieve a high rate of internal heating.

6. The method of detecting subsurface flaws in materials comprising the steps of; making a hologram of a selected portion of the surface of the material, inducing internally generated heat in the interior of a discrete volume of the material adjacent the selected portion, making a second hologram of the selected portion of the surface of the material; illuminating said holograms to reconstruct the wavefronts to produce an image of the surface with a pattern of interference fringes thereon indicative of areas differential change of configuration as an indication of flaws.

7. The invention as defined in claim 6 wherein the step of inducing heat in the discrete volume is performed by electrical induction heating with an induction coil disposed adjacent the surface of the material.

8. The invention as defined in claim 6 wherein the induction heating is produced by an induction coil having turns which define an opening opposite said selected portion of the material.

9. The invention as defined in claim 8 wherein said induction heating is produced by applying impulses of electrical excitation to the induction coil at spaced time intervals, the step of comparing the surface configurations is performed throughout the time of application of several impulses and wherein the frequency of said electrical energization of the induction coil is low enough to obtain the induction of eddy currents internally of said volume of material but high enough to achieve a high rate of internal heating.

* * * * *